(12) United States Patent
Giron et al.

(10) Patent No.: US 7,791,784 B2
(45) Date of Patent: Sep. 7, 2010

(54) ELECTRICALLY-CONTROLLABLE DEVICE WITH VARIABLE OPTICAL AND/OR ENERGY PROPERTIES

(75) Inventors: Jean-Christophe Giron, Eupen (DE); Uwe Van Der Meulen, Nideggen-Schmidt (DE); Franz Beck, Aachen (DE); David Pender, Leipzig (DE)

(73) Assignee: Saint-Gobain Glass France, Courbevoie (FR)

( * ) Notice: Subject to any disclaimer, the term of this patent is extended or adjusted under 35 U.S.C. 154(b) by 570 days.

(21) Appl. No.: 10/563,322

(22) PCT Filed: Jul. 7, 2004

(86) PCT No.: PCT/FR2004/001774

§ 371 (c)(1),
(2), (4) Date: Jan. 12, 2007

(87) PCT Pub. No.: WO2005/006071

PCT Pub. Date: Jan. 20, 2005

(65) Prior Publication Data

US 2007/0103761 A1     May 10, 2007

(30) Foreign Application Priority Data

Jul. 9, 2003   (FR) .................................. 03 08385

(51) Int. Cl.
*G02F 1/15* (2006.01)
(52) U.S. Cl. .................. 359/265; 359/266; 359/275
(58) Field of Classification Search .......... 359/265
See application file for complete search history.

(56) References Cited

U.S. PATENT DOCUMENTS

| 3,932,690 A | 1/1976 | Gliemeroth |
| 4,488,780 A | 12/1984 | Nicholson |

(Continued)

FOREIGN PATENT DOCUMENTS

| BE | 702 812 | 2/1968 |

(Continued)

OTHER PUBLICATIONS

S. Mitaray, et al., "Preparation De Couches Minces DE $Ag_2O$ Et Action De Certains Gaz Sur Celles-CI", Thin Solid Films, vol. 46, No. 2, pp. 201-208 Oct. 17, 1977.

(Continued)

*Primary Examiner*—Jessica T Stultz
(74) *Attorney, Agent, or Firm*—Oblon, Spivak, McClelland, Maier & Neustadt, L.L.P.

(57) ABSTRACT

Electrically controllable device having variable optical/energy properties in transmission or in reflection, comprising at least one carrier substrate provided with a stack of electrochromically functional layers, including at least two electrochromic active layers, separated by an electrolyte, the said stack being placed between two current leads, namely the lower current lead and the upper current lead respectively ("lower" corresponding to the current lead closest to the carrier substrate, as opposed to the "upper" current lead that is furthest from the said substrate), characterized in that the stack of functional layers is joined to at least one polymer film, the percentage shrinkage of which is between 0.6 and 2.0% and preferably between 0.8 and 1.5%.

18 Claims, 1 Drawing Sheet

U.S. PATENT DOCUMENTS

| | | | |
|---|---|---|---|
| 4,573,768 A * | 3/1986 | Polak et al. ............... 359/270 |
| 4,654,067 A | 3/1987 | Ramus et al. |
| 4,691,077 A | 9/1987 | Gregory et al. |
| 4,773,741 A * | 9/1988 | Inaba et al. ............... 359/266 |
| 4,851,095 A | 7/1989 | Scobey et al. |
| 4,927,246 A | 5/1990 | Ito et al. |
| 5,187,496 A | 2/1993 | Yu |
| 5,239,406 A | 8/1993 | Lynam |
| 5,240,646 A * | 8/1993 | Gillet et al. ............ 252/519.12 |
| 5,454,919 A | 10/1995 | Hill et al. |
| 5,532,062 A | 7/1996 | Miyazaki et al. |
| 5,548,475 A | 8/1996 | Ushikubo et al. |
| 5,569,362 A | 10/1996 | Lerbet et al. |
| 5,598,293 A * | 1/1997 | Green ...................... 359/275 |
| 5,770,321 A | 6/1998 | Hartig et al. |
| 5,962,080 A | 10/1999 | Tan et al. |
| 5,981,076 A | 11/1999 | Ojeda |
| 5,985,486 A | 11/1999 | Giron |
| 6,002,208 A | 12/1999 | Maishev et al. |
| 6,086,727 A | 7/2000 | Pinarbasi |
| 6,190,511 B1 | 2/2001 | Wei |
| 6,277,523 B1 | 8/2001 | Giron |
| 6,284,360 B1 | 9/2001 | Johnson et al. |
| 6,316,110 B1 | 11/2001 | Anzaki et al. |
| 6,337,758 B1 | 1/2002 | Beteille et al. |
| 6,466,298 B1 * | 10/2002 | Fix et al. .................... 349/195 |
| 6,500,676 B1 | 12/2002 | Ramberg |
| 6,529,308 B2 | 3/2003 | Beteille et al. |
| 6,746,775 B1 | 6/2004 | Boire et al. |
| 6,747,779 B1 | 6/2004 | Morin et al. |
| 6,791,737 B2 | 9/2004 | Giron |
| 6,809,066 B2 | 10/2004 | Reade et al. |
| 6,872,453 B2 | 3/2005 | Arnaud et al. |
| 6,940,628 B2 | 9/2005 | Giron |
| 7,002,720 B2 | 2/2006 | Beteille et al. |
| 7,012,728 B2 | 3/2006 | Morin et al. |
| 7,300,166 B2 * | 11/2007 | Agrawal et al. ............. 359/604 |
| 2002/0037421 A1 | 3/2002 | Arnaud et al. |
| 2002/0086164 A1 | 7/2002 | Anzaki et al. |
| 2002/0110934 A1 | 8/2002 | Uchiyama et al. |
| 2002/0139772 A1 | 10/2002 | Fenner |
| 2003/0064198 A1 | 4/2003 | Thomsen et al. |
| 2004/0053125 A1 | 3/2004 | Giron et al. |
| 2004/0067343 A1 | 4/2004 | Beteille et al. |
| 2004/0169789 A1 | 9/2004 | Mathey et al. |
| 2004/0229049 A1 | 11/2004 | Boire et al. |
| 2005/0002081 A1 | 1/2005 | Beteille et al. |
| 2005/0041276 A1 | 2/2005 | Beteille et al. |
| 2005/0147825 A1 | 7/2005 | Arnaud et al. |
| 2006/0033978 A1 | 2/2006 | Morin et al. |

FOREIGN PATENT DOCUMENTS

| | | |
|---|---|---|
| EP | 0 353 141 | 1/1990 |
| EP | 0 363 045 | 4/1990 |
| EP | 601 928 | 6/1994 |
| EP | 0 753 438 | 1/1997 |
| FR | 2 227 123 | 11/1974 |
| FR | 2 829 723 | 3/2003 |
| GB | 1 202 719 | 8/1970 |
| JP | 03 115142 | 5/1991 |
| WO | 99/45415 | 9/1999 |

OTHER PUBLICATIONS

"Handbook of Sputter Deposition Technology", p. 146, Wasa and Hayakawa, 1992.

U.S. Appl. No. 10/564,501, filed Jan. 13, 2006, Giron, et al.

U.S. Appl. No. 10/562,451, filed Dec. 27, 2005, Baubet, et al.

U.S. Appl. No. 10/562,121, filed Dec. 23, 2005, Baubet, et al.

* cited by examiner

ELECTRICALLY-CONTROLLABLE DEVICE WITH VARIABLE OPTICAL AND/OR ENERGY PROPERTIES

CROSSS-REFEERENCE TO RELATED APPLICATIONS

The present application is a 371 application PCT/FR2004/001774 filed on Jul. 7, 2004.

FIELD OF THE INVENTION

The invention relates to electrically controllable devices having variable optical and/or energy properties. It relates more particularly to devices that use electrochromic systems operating in transmission or in reflection.

BACKGROUND OF THE INVENTION

Examples of electrochromic systems are described in Patents U.S. Pat. No. 5,239,406 and EP-612 826.

Electrochromic systems have been extensively studied. They are known to comprise in general two layers of electrochromic materials separated by an electrolyte and flanked by two electrodes. Each of the electrochromic layers, under the effect of an electrical supply, can inject charges reversibly, the change in their oxidation state as a result of these injections/ejections resulting in a change in their optical and/or thermal properties (for example, in the case of tungsten oxide, a switch from a blue coloration to a colourless appearance).

It is common practice to classify electrochromic systems in three categories:
  that in which the electrolyte is in the form of a polymer or a gel, for example, a protonically conducting polymer such as those described in Patents EP-253 713 or EP-670 346, or a polymer conducting by lithium ions such as those described in Patents EP-382 623, EP-518 754 and EP-532 408, the other layers of the system generally being of an inorganic nature;
  that in which the electrolyte is an essentially inorganic layer. This category is often referred to by the term "all-solid-state" system—examples of such may be found in Patents EP-867 752 and EP-831 360, French Patent Application FR-2 791 147 and French Patent Application FR-2 781 084; and that in which all the layers are based on polymers, the category then being often referred to by the term "all-polymer" system.

Many applications have already been envisaged for these systems. They are employed most generally as glazing for buildings or as glazing for vehicles, especially as sunroofs, or else, when they operate in reflection and no longer in transmission, as antidazzle rearview mirrors.

However, for all these applications, owing to their sensitivity to environmental attack, the electrically controllable devices are not generally inserted as they are within a substrate, but are protected within a laminated substrate that also incorporates at least one lamination interlayer, which is generally a polymer film.

This polymer film may optionally have a solar-protection function for the purpose of protecting the layers of the electrochromic system from being heated up by infrared radiation. In another configuration, the solar-protection function is attached to the layers of the stack of the electrochromic system.

However, and whatever the origin of the solar-protection function, the reliability of the electrochromic systems, which may for example be expressed in terms of the durability of the switching of cycles between a colouration state and a non-colouration state of the active layers, is dependent on the temperature, and any temperature variation (in particular an increase in temperature of the active layers as a result of intensive exposure to infrared radiation (electrochromic roof placed in full sunlight)) results in an increase in the rate of degradation of the said active layers.

Conventionally, this solar-protection function is performed by an antireflection coating, which usually consists of a stack of thin interferential layers, in general an alternation of layers based on a dielectric material or based on a metal oxide, especially of the metal oxide, nitride or oxynitride type, having high and low refractive indices.

Although it perfectly fulfils its role of protecting the active layers of the electrochromic system from infrared radiation, the solar-protection layer, which is optionally incorporated within the lamination interlayer, must also withstand the mechanical stresses resulting from the lamination.

These stresses are all the more substantial when the laminated substrate has a complex profile (a substrate with a large deflexion in at least one direction, such as a doubly curved substrate).

SUMMARY OF THE INVENTION

The object of the present invention is therefore to alleviate these drawbacks by proposing an electrically controllable device that incorporates at least one polymer film that is suitable for complex substrate profiles.

The subject of the invention is therefore an electrically controllable device having variable optical/energy properties in transmission or in reflection, comprising at least one carrier substrate provided with a stack of functional layers, including at least two electrochromic active layers, separated by an electrolyte, the said stack being placed between two current leads, namely the lower current lead and the upper current lead respectively ("lower" corresponding to the current lead closest to the carrier substrate, as opposed to the "upper" current lead that is furthest from the said substrate), characterized in that the stack of functional layers is joined to at least one polymer film, the percentage shrinkage of which is between 0.6 and 2.0% and preferably between 0.8 and 1.5%.

By using a flexible polymer film, the electrically controllable system may be inserted without any risk into a laminated substrate of complex profile.

In preferred embodiments of the invention, one or other of the following arrangements may furthermore optionally be used:
  the polymer film is a birefringent dielectric multilayer film suitable for reflecting at least 50% of the light within a spectral band of at least 100 nm in width;
  the device constitutes a vehicle sunroof, which can be actuated autonomously, or a vehicle side window or rear window;
  the device constitutes a windscreen or portion of a windscreen;
  the windscreen has a complexity value F of between 0.00215 and 0.00240 and preferably between 0.00219 and 0.00230;
  the device is located in the top part of the windscreen, especially in the form of one or more bands along the outline of the windscreen;
  the device is located in the central part of the windscreen, especially in order to prevent a driver being dazzled at night, with the aid of automated control of its power supply using at least one camera and/or at least one light sensor;

the device constitutes a graphical and/or alphanumeric data display panel, glazing for buildings, a rearview mirror, an aircraft cabin window or windscreen, or a skylight;

the device constitutes interior or exterior glazing for buildings, or is used as a shop showcase or countertop, which may be curved, or is even used as glazing for the protection of an object of the painting type, as a computer antidazzle screen, or as glass furniture;

the device operates in transmission or in reflection;

the device includes at least one transparent, plain or curved, clear or bulk-tinted substrate, polygonal in shape or at least partly curved;

the device includes an opaque or opacified substrate;

the electronic conductivity of at least one of the active layers is sufficient for replacing the conducting layers with a grid of wires; and the conducting wires increase the conductivity of the active layers, in order to guarantee colouration uniformity.

BRIEF DESCRIPTION OF THE DRAWINGS

The invention will be described in greater detail in conjunction with the appended drawings in which.

In the appended drawings, some of the elements may be shown on a larger or smaller scale than in reality, so as to make the figures easier to understand.

DETAILED DESCRIPTION OF THE DRAWINGS

Figure 1:
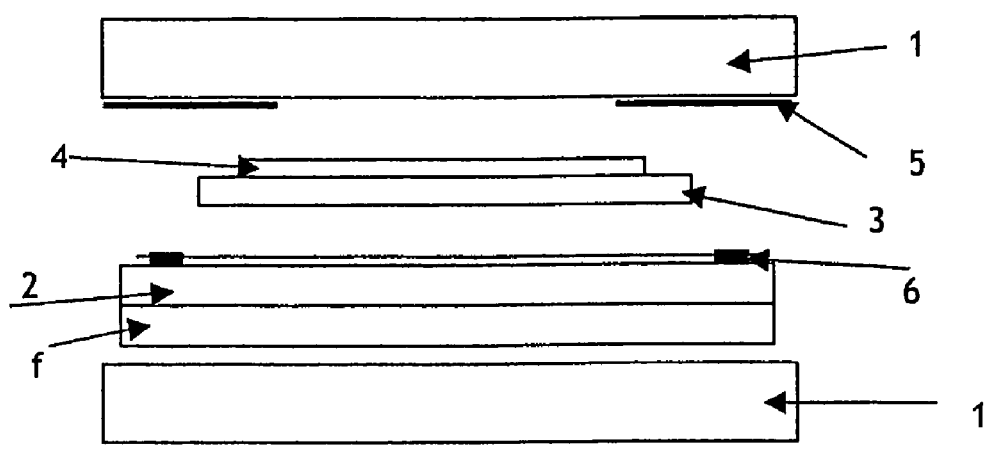
FIG. 1 is a schematic view of an electrically controllable device according to the invention.

FIG. 1 shows a glass plate 1 provided with a lower conducting layer 2, with an active stack 3, surmounted by an upper conducting layer 4, with a first grid of conducting wires 5 or an equivalent device for taking the electric current above the upper conducting layer and with a second grid of conducting wires 6 or an equivalent device for taking the electric current below the lower conducting layer 2. The current leads are either conducting wires if the electrochromic active layer is sufficiently conducting, or a grid of wires running over or within a layer forming an electrode, this electrode being made of metal or being of the TCO (Transparent Conductive Oxide) type made of ITO, $F:SnO_2$ or $Al:ZnO$, or a single conducting layer.

The conducting wires 5, 6 are metal wires, for example made of tungsten (or copper), optionally coated with carbon, with a diameter between 10 and 100 µm and preferably between 20 and 50 µm, these being straight or wavy, and placed on a polymer sheet by a technique known in the wire-heated windshield field, for example a technique described in Patents EP-785 700, EP-553 025, EP-506 521 and EP496 669.

One of these known techniques consists in using a heated press wheel that presses the wire against the surface of the polymer sheet, this press wheel being fed with wire from a feed reel via a wire guide device.

The lower conducting layer 2 is a bilayer formed from a 50 nm SiOC first layer surmounted by a 400 nm $F:SnO_2$ second layer (both layers preferably deposited in succession by CVD on the float glass before cutting).

Alternatively, it may be a bilayer formed from an approximately 20 nm optionally doped $SiO_2$-based first layer (said layer being especially doped with aluminium or boron) surmounted by an approximately 100 to 350 nm ITO second layer (both layers preferably vacuum-deposited in succession by magnetically enhanced reactive sputtering in the presence of oxygen, and optionally hot).

The upper conducting layer is a 100 to 300 nm ITO layer, also deposited by magnetically enhanced reactive sputtering on the active stack, or is produced in a manner similar to the lower conducting layer 2.

The active stack 3 shown in FIG. 1 is made of the following:

a first layer of anodic electrochromic material made of hydrated iridium oxide $IrO_xH_y$ 40 to 100 nm in thickness (it may be replaced with a layer of hydrated nickel oxide) possibly alloyed with other metals;

a layer of tungsten oxide 100 nm in thickness;

a second layer of hydrated tantalum oxide or hydrated silicon oxide or hydrated zirconium oxide 100 nm in thickness; and a second layer of cathodic electrochromic material based on tungsten oxide $WO_3$ 370 nm in thickness;

this stack 3 is particularly stable, especially to UV, and operates by insertion/ejection of lithium ions ($Li^+$) or alternatively $H^+$ ions.

The stack 3, the upper and lower conducting layers and the current leads embedded in the surface of a polymer sheet f are deposited on the internal face of a first substrate. The glazing also includes a second substrate, on top of the polymer sheet. The two substrates and the polymer sheet are joined together by a known technique—lamination or calendering—or by heating, possibly with pressure.

The polymer sheet f is a birefringent dielectric multilayer film reflecting at least 50% of the light in a band at least 100 nm in width within a spectral range of interest and able to be shaped to a curved substrate by a uniform contraction effect.

This film is sold under the brand name SRF by 3M and forms a PET/coPMMA-based multilayer about 50 µm in thickness.

According to one characteristic of this film, it has a substantially greater degree of contraction than that of other polymer films that also provide a solar-protection function.

For comparison, the values of the degree of contraction after a heat treatment at 130° C. for 1 hour are given below.

These values should be compared with that of a conventional PET film sold by Southwall, which incorporates a solar-protection coating.

The contraction values for this PET film are between 0.25% and 0.45%. The contraction values for the film sold by 3M are between 0.8% and 1.5% for a standard manufacture, and between 1.6% and 1.9% for a special manufacture that was developed for the requirements of the invention.

Within the context of the invention, a parameter F has been defined that makes it possible to characterize the complexity of glazing that incorporates the polymer film, for example that developed by 3M.

The parameter F is calculated in the following manner:

$$F = \frac{H_O Y_O}{C_O Y_O} \times \frac{H_O Z_O}{C_O Z_O}.$$

Figure 2:
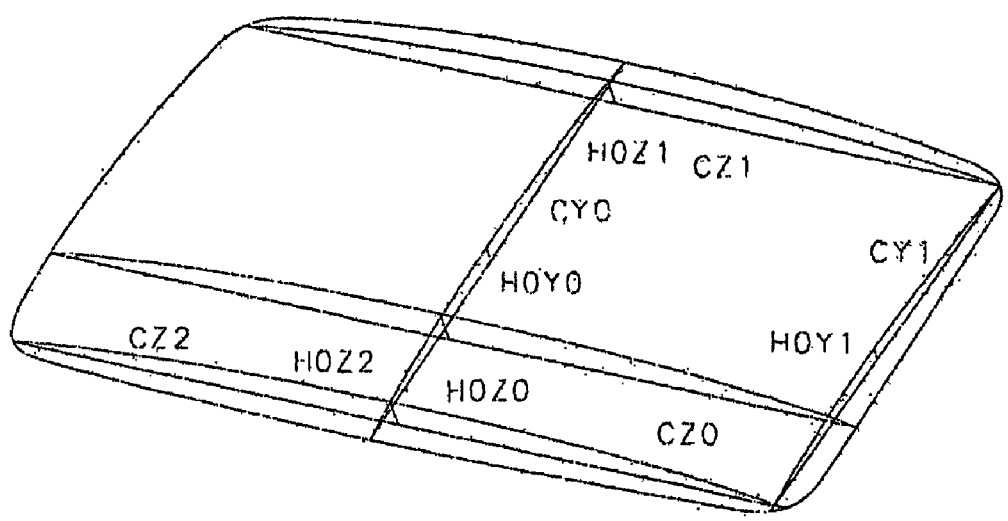
FIG. 2 gives the position of the various points needed to calculate the complexity factor F.

The reader may refer to the graphic given in FIG. 2 for the spatial positioning of the various points mentioned in the above formula.

This polymer film is incorporated within a laminated substrate, the complexity value F of which is between 0.00215 and 0.00240 and preferably between 0.00219 and 0.00230.

The combination of the three parts produces an electrically controllable device having variable optical and/or energy properties, the electrochromic material for which is protected from the outside, thereby increasing the lifetime of the electrically controllable device. The polymer film is particularly suitable for protecting the layer of functional (for example electrochromic) material from impacts, especially by chippings which may result in star-shaped shatter marks of the substrate. It may also be noted that the polymer film constitutes a moisture barrier, which effectively slows down the rate of deterioration at the site of impacts caused by chippings.

Moreover, the two glass plates forming the substrates of the electrically controllable device described above are made of standard, flat clear silica-soda-lime glass, each having a thickness of about 2 mm, and at least one possibly being bulk-tinted.

Thus, an illustrative example of the invention is made up as follows: glass (2.1 mm)/PU (0.76 mm)/polymer film/PU (0.76 mm)/functional layer/grey glass (2.1 mm).

When this functional layer is the electrochromic system mentioned above, measurements give:

Coloured state:

$T_L=1.1\%; a^*=-2; b^*=-14; T_E=0.7\%; R_E=22\%;$

Non-coloured state:

$T_L=18\%; a^*=-6; b^*=7; T_E=10\%; R_E=21\%.$

In this configuration, the polymer film has dimensions smaller than those of the substrates between which it is incorporated; the polymer film follows the screen-printing contours in such a way that the edges of the film are embedded in the screen-printing points. This configuration makes it possible to achieve even higher curving complexity values (F).

The invention applies in the same way to curved and/or toughened glass substrates.

Likewise, at least one, of the glass substrates may be bulk-tinted, especially tinted blue or green, grey, bronze or brown.

The substrates used in the invention may also be based on a polymer (PMMA, PC, etc.). It should also be noted that the substrates may have very varied geometrical shapes: they may be in the form of a square or rectangle, but also in the form of any polygon or at least partly curved profile, defined by rounded or undulating contours (round, oval, "waves", etc.).

Moreover, at least one of the two glass substrates (on that face which is not provided with the electrochromic or equivalent system) may be covered with a coating having another functionality (this other functionality possibly being, for example, a solar-protection stack, an antifouling stack or the like). As regards the solar-protection stack, this may be a stack of thin layers deposited by sputtering and including at least one silver layer. It is thus possible to have combinations of the following types:

glass/electrochromic system/solar-protection layers/glass;
glass/electrochromic system/glass/thermoplastic/glass;
glass/electrochromic system/thermoplastic/glass; and
glass/thermoplastic/electrochromic system/thermoplastic/glass.

The solar-protection coating may also be deposited, not on one of the glass substrates, but on a sheet of flexible polymer of the PET (poly(ethylene terephthalate)) type.

For examples of solar-protection coatings, the reader may refer to Patents EP 826 641, EP 844 219, EP 847 965, WO99/45415 and EP 1 010 677.

The device forming the subject of the invention described above may also be incorporated into a three-glass "substrate", the latter being advantageously used for the production of glazing that meets the safety requirements.

Moreover, it may be noted that the electrically controllable device as described above has the advantage of being transparent to electromagnetic waves.

Thus, these electrically controllable devices incorporating electrochromic and solar-protection functionalities are being increasingly used in the motor-vehicle field, which often requires transparency to electromagnetic waves (mobile telephones, various types of remote control, automatic payment systems at motorway toll barriers, etc.).

The invention claimed is:

1. An electrically controllable device having variable optical/energy properties in transmission or in reflection, comprising:
   at least one carrier substrate provided with a stack of electrochromically functional layers, including at least two electrochromic active layers, separated by an electrolyte,
   wherein the stack is between a lower current lead and an upper current lead, wherein the lower current lead is positioned nearest to the carrier substrate and the upper current lead is positioned furthest from the substrate, and wherein the stack of functional layers is joined to at least one polymer film, the polymer film having a percentage shrinkage between 0.6 and 2.0%, and
   wherein the substrate is doubly curved.

2. The electrically controllable device according to claim 1, wherein the polymer film is a birefringent dielectric multilayer film suitable for reflecting at least 50% of the light within a spectral band of at least 100 nm in width.

3. The electrically controllable device according to claim 1, which constitutes a vehicle sunroof, which can be actuated autonomously, or a vehicle side window or a rear window.

4. The electrically controllable device according to claim 1, which constitutes a windscreen or a portion of a windscreen.

5. The electrically controllable device according to claim 4, which is located in the top part of the windscreen.

6. The electrically controllable device according to claim 4, which is located in the central part of the windscreen, with the aid of automated control of its power supply using at least one camera and/or at least one light sensor.

7. The electrically controllable device according to claim 1, which constitutes a graphical and/or alphanumeric data display panel, glazing for buildings, a rearview mirror, an aircraft cabin window or windscreen, or a skylight.

8. The electrically controllable device according to claim 1, which constitutes:
   interior or exterior glazing for buildings;
   a shop showcase or countertop, which may be curved;
   glazing for the protection of an object of the painting type;
   a computer antidazzle screen; or
   glass furniture.

9. The electrically controllable device according to claim 1, which operates in transmission or in reflection.

10. The electrically controllable device according to claim 1, wherein at least one carrier is transparent or tinted and wherein at least one carrier is curved polygonal, or partly curved.

11. The electrically controllable device according to claim 1, which includes an opaque or opacified substrate.

12. The electrically controllable device according to claim 1, wherein an electronic conductivity of at least one of the active layers is sufficient for replacing the conducting layers with a grid of wires.

13. The electrically controllable device according to claim 12, wherein the conducting wires increase the conductivity of the active layers, in order to guarantee colouration uniformity.

14. The electrically controllable device of claim 1, wherein the percentage shrinkage of the polymer film is between 0.8 and 1.5%.

15. The electrically controllable device of claim 5, which is located in the form of one or more bands along the outline of the windscreen.

16. The electrically controllable device according to claim 1, wherein the stack of electrochromically functional layers comprises
- a first layer of anodic electrochromic material comprising hydrated iridium oxide or hydrated nickel oxide, which can include one or more other metals,
- a layer of tungsten oxide;
- a layer of hydrated tantalum oxide or hydrated silicon oxide or hydrated zirconium oxide; and
- a layer of cathodic electrochromic material based on tungsten oxide.

17. The electrically controllable device according to claim 1, wherein the polymer film is a planar or substantially planar film contacting only one surface of a lower conducting layer.

18. The electrically controllable device according to claim 1, wherein the polymer film has dimensions smaller than those of the layers between which the polymer film is positioned.

* * * * *